(12) United States Patent
Wugofski

(10) Patent No.: US 7,444,661 B1
(45) Date of Patent: Oct. 28, 2008

(54) ELECTRONIC PROGRAM GUIDE UTILIZING MULTIPLE TUNING SOURCES

(75) Inventor: Theodore David Wugofski, Fort Worth, TX (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/408,924

(22) Filed: Sep. 30, 1999

(51) Int. Cl.
  *H04N 5/445* (2006.01)
  *G06F 13/00* (2006.01)
  *G06F 3/00* (2006.01)

(52) U.S. Cl. ............... 725/49; 725/50; 725/51; 725/56; 725/80; 725/82

(58) Field of Classification Search ............. 725/49–51, 725/56, 59, 80, 82
  See application file for complete search history.

(56) References Cited

U.S. PATENT DOCUMENTS

| | | | |
|---|---|---|---|
| 4,115,846 A | 9/1978 | Laine | 364/200 |
| 4,697,209 A | 9/1987 | Kiewit et al. | 358/84 |
| 4,706,121 A | 11/1987 | Young | 358/142 |
| 5,151,789 A | 9/1992 | Young | 358/194.1 |
| 5,353,121 A | 10/1994 | Young et al. | 348/563 |
| 5,438,372 A * | 8/1995 | Tsumori et al. | 348/565 |
| 5,532,754 A | 7/1996 | Young et al. | 348/569 |
| 5,534,911 A * | 7/1996 | Levitan | 725/46 |
| 5,550,576 A * | 8/1996 | Klosterman | 725/46 |
| 5,559,548 A | 9/1996 | Davis et al. | 348/6 |
| 5,629,733 A | 5/1997 | Youman et al. | 348/7 |
| 5,635,978 A | 6/1997 | Alten et al. | 348/7 |
| 5,686,954 A | 11/1997 | Yoshinobu et al. | 348/13 |
| 5,699,107 A | 12/1997 | Lawler et al. | 348/13 |
| 5,732,338 A | 3/1998 | Schwob | 455/158.5 |
| 5,751,282 A | 5/1998 | Girard et al. | 345/327 |
| 5,751,372 A | 5/1998 | Forson | 348/569 |
| 5,758,257 A | 5/1998 | Herz et al. | 455/2 |
| 5,760,821 A | 6/1998 | Ellis et al. | 348/10 |
| 5,794,207 A | 8/1998 | Walker et al. | 705/23 |
| 5,801,753 A | 9/1998 | Eyer et al. | 348/13 |
| 5,801,787 A | 9/1998 | Schein et al. | 348/569 |
| 5,805,204 A | 9/1998 | Thompson et al. | 348/13 |
| 5,805,235 A | 9/1998 | Bedard | 348/569 |
| 5,808,694 A * | 9/1998 | Usui et al. | 725/49 |
| 5,828,945 A * | 10/1998 | Klosterman | 455/42 |
| 5,883,621 A * | 3/1999 | Iwamura | 725/37 |
| 6,133,910 A * | 10/2000 | Stinebruner | 725/49 |
| 6,199,136 B1* | 3/2001 | Shteyn | 710/305 |
| 6,219,839 B1* | 4/2001 | Sampsell | 725/40 |
| 6,321,382 B1* | 11/2001 | Wugofski | 725/59 |
| 6,507,951 B1* | 1/2003 | Wugofski | 725/59 |
| 6,526,576 B1* | 2/2003 | Kwoh | 725/39 |
| 6,618,764 B1* | 9/2003 | Shteyn | 709/249 |
| 6,993,789 B1* | 1/2006 | Sezan et al. | 725/142 |

* cited by examiner

*Primary Examiner*—Hunter B. Lonsberry
(74) *Attorney, Agent, or Firm*—Scott Charles Richardson; The Brevetto Law Group, PLLC

(57) ABSTRACT

A system, software and method capable of communicating with a device coupled to the system via a network such that the tuning capabilities of the device can be made available for access and control via the system's program guide through placement of the device's tuning capabilities as a channel selection on the system's program guide.

19 Claims, 4 Drawing Sheets

ELECTRONIC PROGRAM GUIDE UTILIZING MULTIPLE TUNING SOURCES

FIELD OF THE INVENTION

The present invention generally relates to the field of information handling systems, and particularly to an electronic program guide (EPG) for an information handling system.

BACKGROUND OF THE INVENTION

It is often desirable to provide a program guide in an electronic format that provides programming information such as broadcast or cable television programming schedules for regularly scheduled programs and events. The electronic program guide (EPG) may be compiled by a service provider and delivered to the user via electronic transmissions systems. The electronic program guide is then displayable on an information handling system such that the user may view the programming information to decide which programs to watch and at what times to watch them.

One disadvantage of the traditional electronic program guide is that it typically only includes information for tuning devices directly coupled with the information handling system for which the electronic program guide is utilized. For example, an information handling system such as a personal computer and television (PC-TV) convergence device at a first room may be coupled with a cable system for receiving cable television programming signals via a coaxial cable or may be coupled to a satellite dish antenna for receiving satellite television programming signals via a microwave signal transmitted from a satellite. However, a television located in a second room remote from the first room may be coupled to a videocassette recorder (VCR) for displaying information recorded on a videocassette. Further, the VCR may be coupled to a radio frequency (RF) antenna for receiving a television programming signal broadcast over the airwaves. Since the electronic program guide typically provides information about information only regarding tuning devices directly coupled to the PC-TV, the VCR signal is not included as an available tuning device in the electronic program guide.

Furthermore, even if an information handling system in a first room were coupled with a remote tuning source located in a second room, for example, by utilization of a long coaxial cable run between the rooms, the user would be required to manually enter the identity and characteristics of the remote tuning source into the information handling system and the electronic program guide before the information handling system could properly utilize the device.

It would be therefore highly desirable to provide an electronic program guide for an information handling system that is capable of detecting remote tuning devices coupled to the information handling system through a local network, determining information about the tuning devices, and controlling the tuning devices via the network to provide a signal to the information handing system such that the signal is capable of being displayed on a display coupled to the information handling system.

SUMMARY OF THE INVENTION

The present invention is directed to an information handling system for utilizing an electronic program guide, and a device coupled to the information handling system via a network. In one embodiment, the information handling system includes a processor for executing a program of instructions on the information handling system, a memory coupled to the processor for storing a program of instructions executable by the processor, and a program of instructions comprising a program guide storable in the memory and executable by the processor for causing the information handling system to utilize a device coupled to the information handling system via a network such that information encoded in a signal provided by the device may be received by the information handling system.

The present invention is further directed to a method for utilizing a program guide with an information handling system. In one embodiment, the method includes steps for generating program guide data for programming information available from a first device coupled the information handling system, searching for devices coupled to a network to which the information handling system is coupled, or allowing for devices to announce when they are on the network along with their corresponding capabilities, identifying at least one device coupled to the network, determining whether the identified device is capable of being utilized as a program source, and in the event the identified device is determined to be capable of being utilized as a program source, adding the device to the program guide.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWING

The numerous advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
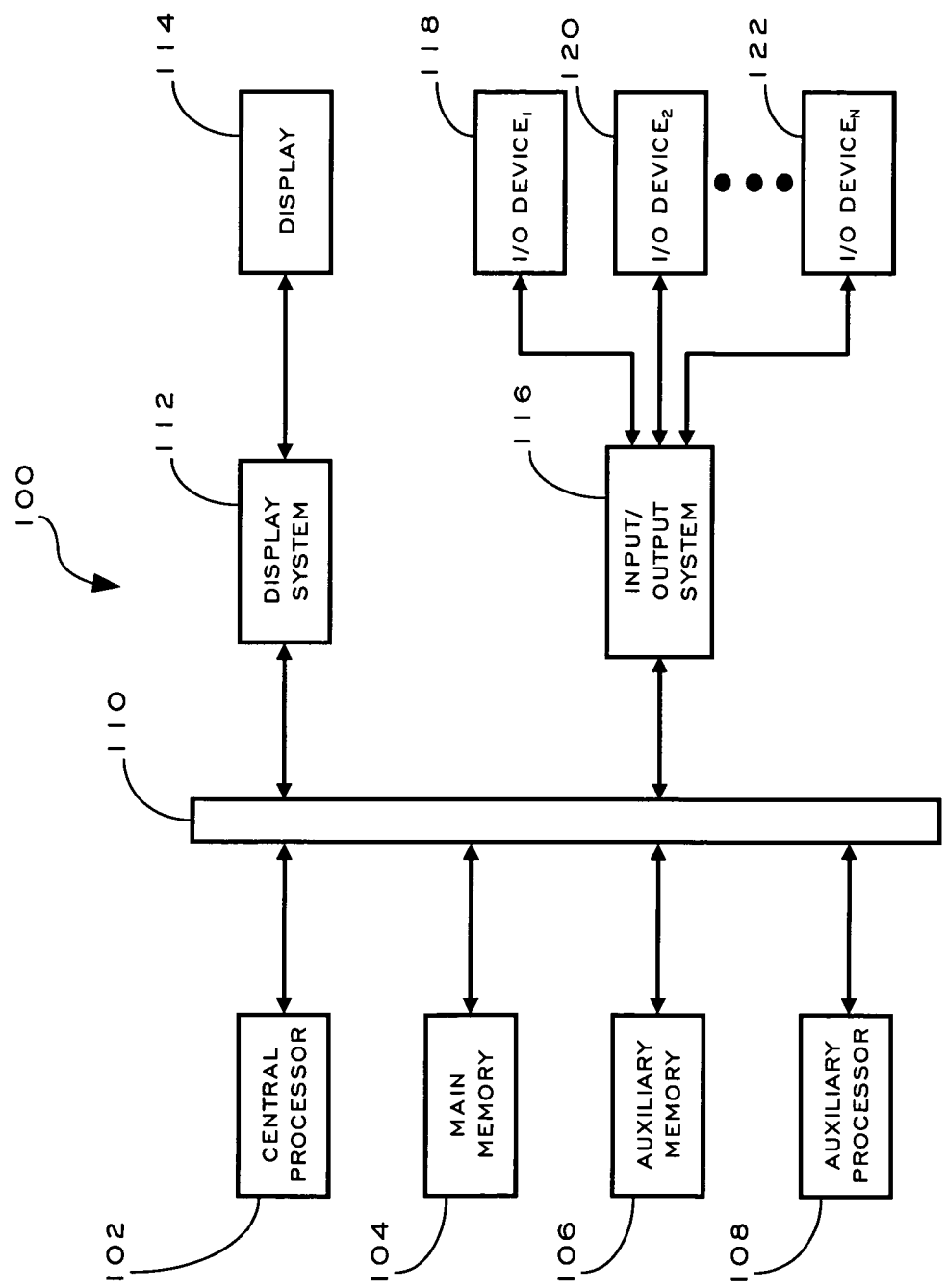
FIG. 1 is a block diagram of an information handling system operable to embody the present invention.

Referring now to FIG. 1, a hardware system in accordance with the present invention is shown. The hardware system shown in FIG. 1 is generally representative of the hardware architecture of an information handling system of the present invention. A central processor 102 controls the information handling system 100. Central processor 102 includes a central processing unit such as a microprocessor or microcontroller for executing programs, performing data manipulations and controlling the tasks of information handling system 100. Communication with central processor 102 is implemented through a system bus 110 for transferring information among the components of information handling system 100. Bus 110 may include a data channel for facilitating information transfer between storage and other peripheral components of information handling system 100. Bus 110 further provides the set of signals required for communication with central processor 102 including a data bus, address bus, and control bus. Bus 110 may comprise any state of the art bus architecture according to promulgated standards, such as industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 110 may be compliant with any promulgated industry standard. For example, bus 110 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394 or Fire Wire, Apple Desktop Bus (ADB), Concentration Highway Interface (CHI), Geo Port, or Small Computer Systems Interface (SCSI), as examples.

Other components of information handling system 100 include main memory 104, auxiliary memory 106, and an auxiliary processor 108 as required. Main memory 104 provides storage of instructions and data for programs executing on central processor 102. Main memory 104 is typically a semiconductor based memory, such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processor 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118, 120, and up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118-122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118-122 may provide or receive analog or digital signals for communication between information handling system 100 of the present invention and external devices, networks, or information sources. Input/output system 116 and I/O devices 118-122 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. 1 by one having ordinary skill in the art would not depart from the scope or the spirit of the present invention.

Figure 2:
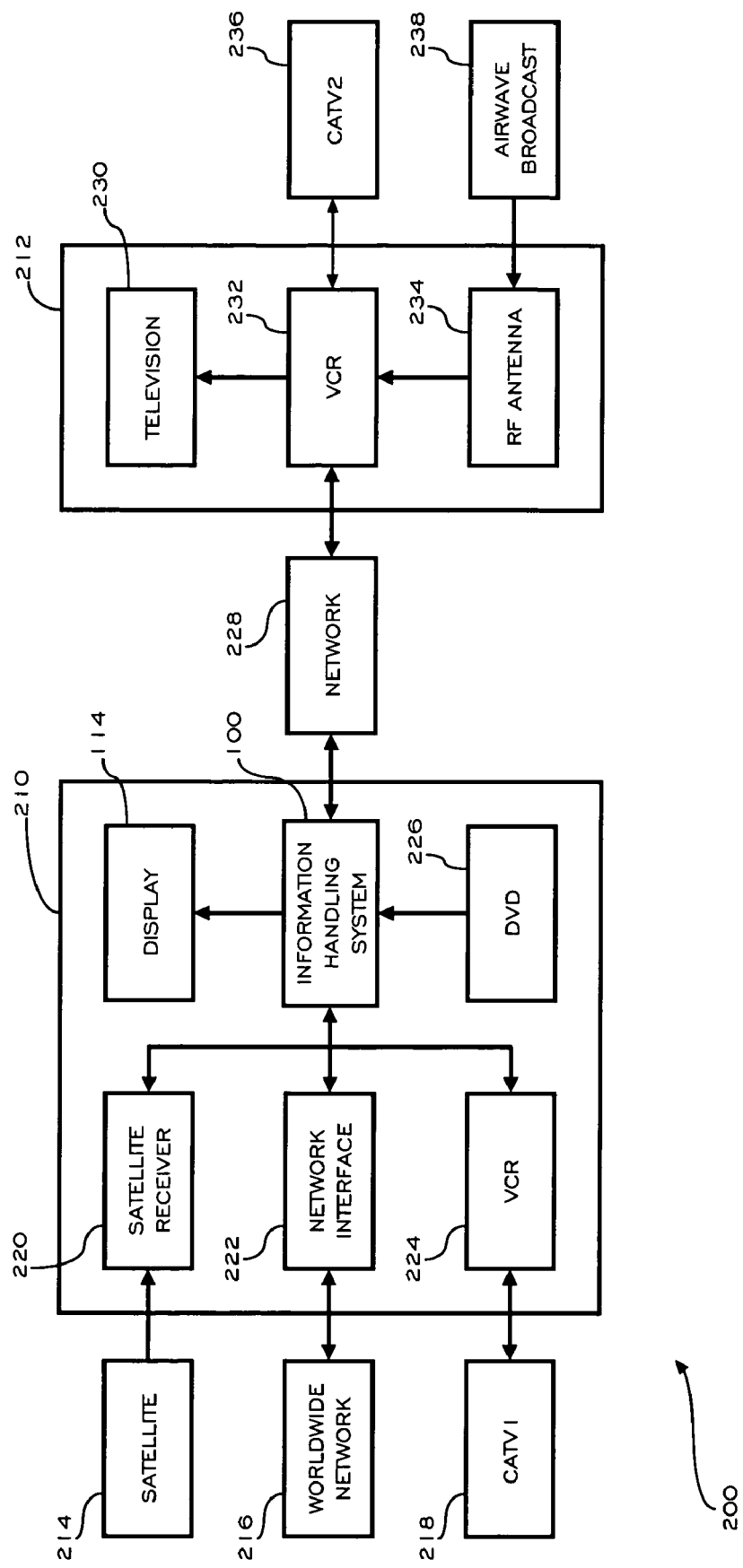
FIG. 2 is a block diagram of an electronic program guide system in accordance with the presence invention.

Referring now to FIG. 2, a block diagram of an electronic program guide system in accordance with the present invention will be discussed. The local network 200 may be implemented in a single area or structure such as a home or office having several locations or rooms, including a first location 210 and a second location 212 remote from first location 210. Information handling system 100 may be disposed at first location 210 and be coupled with display 114 for displaying information such as television programming or the like. Information handling system 100 and display 114 may embody a personal computer and television (PC-TV) convergence device. Information handling system 100 may receive an information signal from a satellite television service provider 214 received by a satellite receiver 220 coupled with information handling system 100. Further, information handling system 100 may couple to a worldwide network 216 of information handling systems such as the Internet for receiving an information signal (e.g., multimedia broadcast) via worldwide network 216 and received by a network interface device 222. A videocassette recorder (VCR) 224 coupled with information handling system 100 may receive a cable television signal from a cable television system 218 thereby functioning as a tuning device, and may further provide a signal reproduced from information stored on a videocassette magnetic storage medium. Additional tuning devices or other devices capable of providing a video or audio/video signal may be coupled with information handling system 100 such as a digital versatile disk (DVD) player 226.

A television 230 and second VCR 232 coupled to television 230 may be disposed at a second location 212 remote from first location 210. VCR 232 may be coupled to a second cable television system 236 for receiving a cable television programming signal, and to a radio-frequency (RF) antenna 234 for receiving a television programming signal from an airwave broadcast television station 238. In such a configuration, VCR 232 may operate as a tuning device for tuning signals received from cable television provider 236 or airwave broadcast television station 238. A local network 228 may be included in the structure for coupling a remote tuning device such as VCR 232 with information handling system 100 by utilizing a networking architecture and protocol. For example, network 228 may be a home network compliant with a Home Audio/Video Interoperability (HAVi) specification for networking audio and video devices such as a PC-TV (information handling system 100), satellite receiver 220, network interface 222, VCR 224, DVD 226, television 230, VCR 232, etc. In accordance with the present invention, an electronic program guide (EPG) embodied as a set of instructions executed by information handling system 100 may utilize network 228 for incorporating information regarding tuning sources (e.g., television 230, VCR 232) disposed at second location 212 remote from first location 210 at which information handling system 100 is disposed.

Figure 3:
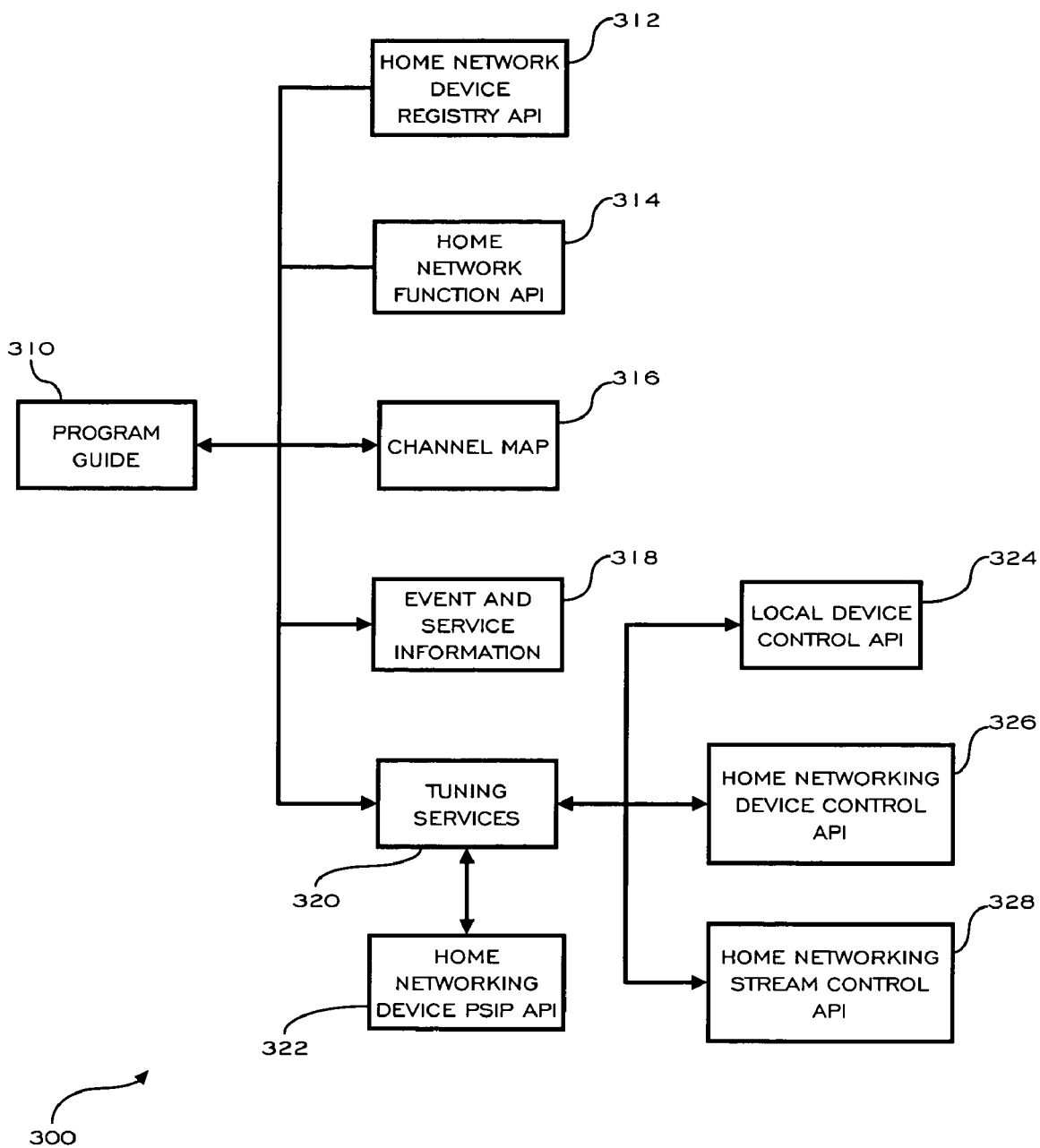
FIG. 3 is a block diagram of an electronic program guide system configured to couple with a home network in accordance with the present invention.

Referring now to FIG. 3, an electronic program guide system configured to couple with a network in accordance with the present invention will be discussed. The electronic program guide system 300 may be embodied as a program of instruction executed by information handling system such that information handing system 100 is configured to perform the tasks of electronic program guide system 300. Electronic program guide system 300 includes a program guide 310 for storing and displaying formatted program information on display 114 of information handling system 100. A home network device registry applications programming interface (API) 312 couples with program guide 310. Home network device registry API provides a set of routines and protocols for communicating with a device registry of network 228 for identifying devices coupled to network 228. The device registry of network 228 is a database of device and device configuration information for devices coupled to network 228. A home network function API 314 couples with program guide 310 for controlling functions that are available for controlling devices coupled to network 228. For example, newer devices added to network 228 may provide control functions that were unavailable for previously existing devices. Home network function API 314 allows program guide 310 to control devices with the newer control functions. A channel map 316 couples with program guide 310 for delineating channels available over network 228 to channels utilized by program guide. For example, if both VCR 224 and VCR 232 utilize channel 4 for tuning, program guide 310 may assign VCR 224 to channel 4 but map channel 4 of VCR 232 to an unused channel in program guide 310 such as channel 8, e.g., as a virtual channel. Channel map 316 thereby stores the associations between virtual channels and actual channels. Actual channel 4 of VCR 232 may be selected by selecting virtual channel 8 of program guide 310. Event and service information list manager 318 couples with and is available to program guide 310 for providing program guide with information regarding events occurring on network 228. For example, event and service information manager informs program manager when devices are added to or removed from network 228. Tuning services routines 320 couple with program guide 310 for controlling the tuning of devices connected to network 228. Home networking device Program and System Information Protocol (PSIP) API 322 couples with tuning services 320 for providing information on communicating over network 228 using the Program and System Information Protocol that specifies how digital television (DTV) signals are transmitted via network 228. A local device control API 324 couples to tuning services 320 for controlling devices directly coupled with information handling system, while a home networking device control API 326 couples with tuning services 320 for controlling devices coupled to information handling system 100 over network 228. A home networking stream control API 328 couples with tuning services 320 routing information between devices coupled to network 228.

Figure 4:
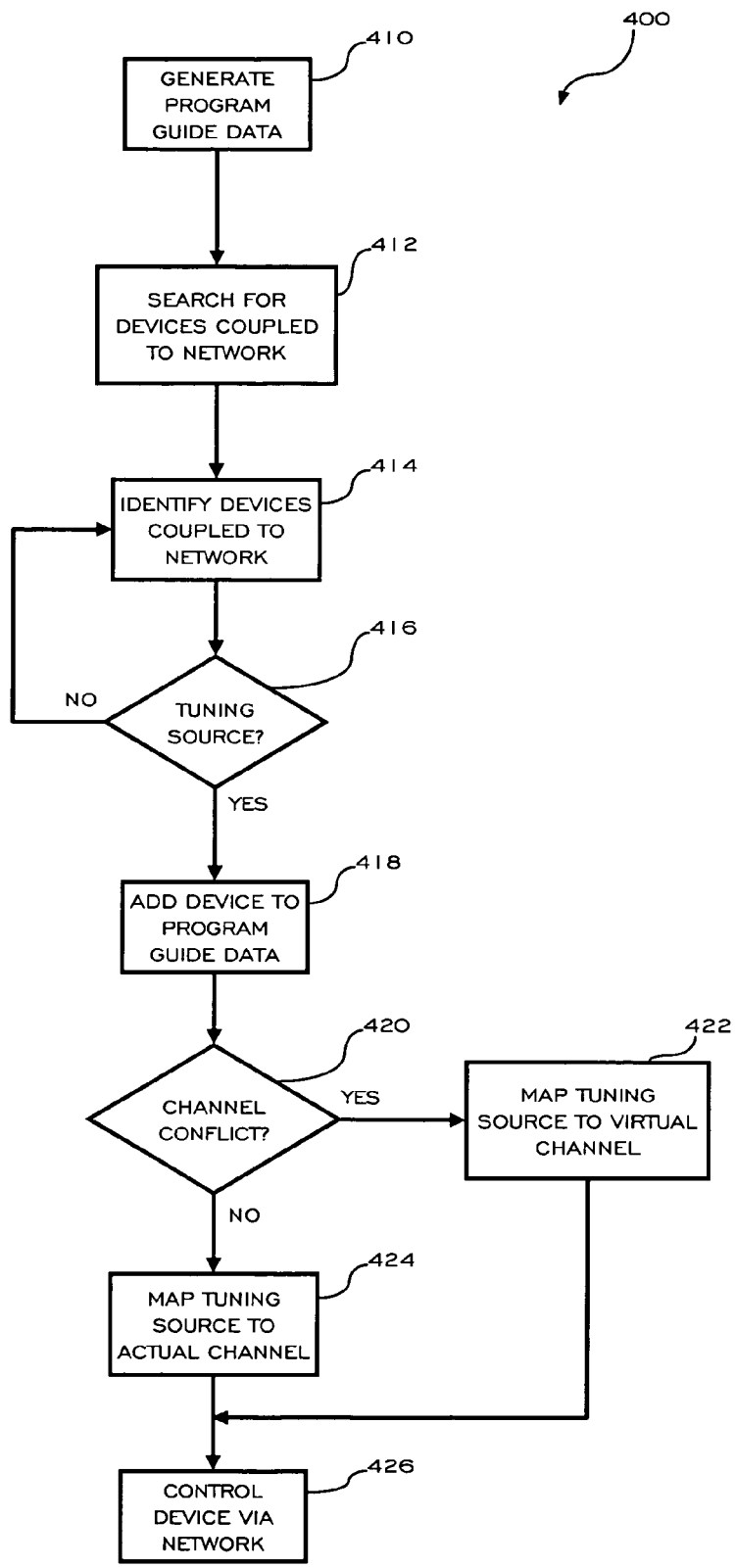
FIG. 4 is a flow diagram of a method for utilizing a program guide in conjunction with a home network.

Referring now to FIG. 4, a flow diagram of a method for utilizing a program guide in conjunction with a home network will be discussed. The method 400 may be implemented by program guide 310 embodied as a program of instructions executed by information handling system 100. Method 400 initiates with the generating of program guide data by program guide 310 at step 410. Program guide 310 may generate program guide data, for example, based upon tuning devices such as satellite receiver 220, network interface device 222, VCR 224, DVD player 226, etc. that are directly connected to information handling system 100. Program guide 310 searches at step 412 for devices coupled to network 228, for example television 230, VCR 232, etc. (In an alternative embodiment, the devices can announce themselves and their capabilities to the network in an active, rather than passive, approach.) Devices coupled to network 228 are then identified at step 414, for example by examining a registry of network 228 with home network device registry API 312. A determination is made at step 416 whether a device in question coupled to network 228 is an available tuning source, i.e., is capable of providing content, or is a potential source of programming material, such as through live feeds (including satellite or cable feeds) or through a fixed medium (such as a videotape or DVD). The determination made at step 416 may be made, for example, based upon information in the registry of network 228 obtained via home network device registry API 312. In the event that the device in question is not a tuning source, devices coupled to network are continued to be identified at step 414. For example, method 400 may continue with device identifying step 414 as devices are added to network 228 by examining event and service information 318. In the event the device in question is a tuning source, the device is added to the program guide data as an available tuning source 418. When a device is added to program guide data, the device is accessible by a user of information handling system 100 via program guide 310 such that the device may be selected via program guide 310, and a signal tuned by the device may be received by information handling system 100 such that information encoded in the signal may be reproduced on display 114. For example, while a user is watching a program received by satellite receiver and displayed on display 114, the user could select to view a signal received by VCR 232 from antenna 234 by also simultaneously displaying the signal on display 114 e.g., using a picture-in-picture display mode. A device coupled to network 228 may be incorporated as a channel of program guide 310 such that a signal tuned by the device may be selected when the user selects the incorporated channel.

A determination is made at step 420 whether a tuned channel of the tuning device in question is already in use by the program guide 310. For example, VCR 232 may be tuned to channel 4 for viewing of a tape, but VCR 224 may also tuned to channel 4 for viewing of a tape, and the program guide 310 already has channel 4 assigned to VCR 224. In the event the tuned channel of the tuning device in question conflicts with a channel of program guide 310, the tuned channel of the tuning device in question may be mapped at step 422 to a virtual channel in channel map 316. If a tuned channel of the tuning device in question does not conflict with a channel of program guide 310, the actual channel of the tuning device is mapped to a corresponding channel of program guide 310 in step 424. After a tuning device coupled to network 228 is incorporated into program guide 310, the device may be controlled at step 426 via network 426 with program guide 310.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory, such as auxiliary memory 106 of FIG. 1, which can be implemented as a hard disk drive, or as a removable memory such as an optical disk for utilization in a CD-ROM drive, or a floppy disk for utilization in a floppy disk drive, or a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the electronic program guide utilizing multiple tuning sources of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A system, comprising:
    a network;
    an information handling system coupled to the network and comprising a processor and a display monitor;
    a first tuning device coupled directly to the information handling system and configured to send first television signals from a first source to the information handling device;
    a second tuning device coupled to the network and configured to send second television signals from a second source to the information handling device via the network;
    a memory of the information handling system suitable to store a program of instructions executable by said processor for producing an electronic program guide including first programming information for the first television signals and second programming information for the second television signals; and
    a first television display device configured to receive and display said electronic program guide.

2. The system according to claim 1, wherein the electronic program guide is configured to provide controls to be displayed on the first television display device to access and control tuning capabilities of the second tuning device via the network.

3. The system according to claim 2, wherein the first television display device is coupled to the network and configured to receive the electronic programming guide from the information handling system via the network.

4. The system according to claim 3, wherein the second tuning device is located remotely in a different room than the information handling system.

5. The system according to claim 3, wherein the second tuning device is coupled directly to a second television display device located in a different room than the first television display device.

6. The system according to claim 1, wherein the second tuning device is coupled directly to a third source and configured to send third television signals from the third source to the information handling device via the network;
    wherein the electronic program guide further includes third programming information for the third television signals.

7. The system according to claim 1, wherein the network conforms to the Home Audio/Video Interoperability (HAVi) specification for sending first and second television signals.

8. The system according to claim 1, wherein the network conforms to the Program and System Information Protocol (PSIP) for sending the electronic programming guide.

9. A method of producing an electronic program guide, the method comprising:
    coupling an information handling system comprising a display monitor directly to a first tuning device configured to receive first television signals from a first source;
    connecting the information handling system to a network, wherein said network is connected to a second tuning device configured to receive second television signals from a second source;
    receiving, at the information handling system, first television signals from the first tuning device;
    receiving, at the information handling system, second television signals from the second tuning device, said second television signals being received via the network;
    generating an electronic program guide comprising first programming information for the first television signals and second programming information for the second television signals; and
    displaying the electronic program guide on a television display device in communication with the information handling system.

10. The method according to claim 9, further comprising:
    providing controls accessible via the television display device, said controls being configured to access and control tuning capabilities of the second tuning device via the network.

11. The method according to claim 9, further comprising:
    searching for additional devices coupled to the network; and
    identifying whether said the additional devices coupled to the network are additional tuning devices.

12. The method according to claim 11, further comprising:
    determining whether the identified additional tuning devices are capable of providing programming material to the information handling system; and
    upon determining the identified additional tuning devices to be capable of providing said programming material, adding access to said programming material via the electronic program guide.

13. The method according to claim 9, wherein the second tuning device is located remotely in a different room than the information handling system.

14. A machine readable program of instructions storable on an information handling system connected to a network, said program of instructions, upon being executed by the information handling system, results in activities comprising:

receiving, at the information handling system, first television signals from a first tuning device; said information handling system comprising a display monitor and being directly coupled to the first tuning device;

receiving, at the information handling system, second television signals from a second tuning device, said information handling system being communicatively connected to the second tuning device via the network;

generating an electronic program guide comprising first programming information for the first television signals and second programming information for the second television signals; and displaying the electronic program guide on a television display device in communication with the information handling system.

15. The program of instructions according to claim 14, further comprising:

providing controls accessible via the television display device, said controls being configured to access and control tuning capabilities of the second tuning device via the network.

16. The program of instructions according to claim 14, further comprising:

searching for additional devices coupled to the network; and identifying whether said the additional devices coupled to the network are additional tuning devices.

17. The program of instructions according to claim 16, further comprising:

determining whether the identified additional tuning devices are capable of providing programming material to the information handling system; and upon determining the identified additional tuning devices to be capable of providing said programming material, adding access to said programming material via the electronic program guide.

18. The program of instructions according to claim 14, wherein the second tuning device is located remotely in a different room than the information handling system.

19. The system according to claim 1, wherein the first source is separate and distinct from the second source.

* * * * *